(12) United States Patent
Kim

(10) Patent No.: US 8,350,994 B1
(45) Date of Patent: Jan. 8, 2013

(54) METHOD OF MANUFACTURING A LIQUID CRYSTAL DISPLAY

(75) Inventor: Woong-Kwon Kim, Kyungki-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 09/246,782

(22) Filed: Feb. 4, 1999

Related U.S. Application Data

(62) Division of application No. 08/874,282, filed on Jun. 13, 1997, now Pat. No. 6,122,025.

(30) Foreign Application Priority Data

Dec. 3, 1996 (KR) ..................................... 96-61218

(51) Int. Cl.
*G02F 1/1333* (2006.01)
(52) U.S. Cl. ........................................................ 349/110
(58) Field of Classification Search .................... 349/110
See application file for complete search history.

(56) References Cited

U.S. PATENT DOCUMENTS

| | | | |
|---|---|---|---|
| 5,120,623 A | 6/1992 | Brosig et al. | |
| 5,654,811 A | 8/1997 | Spitzer et al. | |
| 5,706,064 A | 1/1998 | Fukunaga et al. | |
| 5,847,793 A * | 12/1998 | Itoh | 349/110 |
| 6,008,877 A * | 12/1999 | Akiyama et al. | 349/147 |
| 6,122,025 A * | 9/2000 | Kim | 349/110 |

FOREIGN PATENT DOCUMENTS

| | | |
|---|---|---|
| JP | 63-81327 | 4/1988 |
| JP | 2-230127 | 9/1990 |
| JP | 4-86809 | 3/1992 |

OTHER PUBLICATIONS

English Abstract of JP 4-86809.

* cited by examiner

*Primary Examiner* — Timothy L Rude
(74) *Attorney, Agent, or Firm* — Finnegan Henderson Farabow Garrett & Dunner LLP

(57) ABSTRACT

A liquid crystal display consistent with the present invention comprises an insulating substrate having a signal line and a scan line. The scan line forms a crossing pattern with the signal line. A switching device is connected to the signal line and the scan line. An interlayer insulating film is formed on top of the signal line, the scan line, and the switching device. A pixel electrode is formed on the interlayer insulating film and connected to the switching device. A trench is formed in a part of the interlayer insulating film where the pixel electrode is not formed. Finally, a black matrix is formed in a predetermined part of the trench.

13 Claims, 12 Drawing Sheets

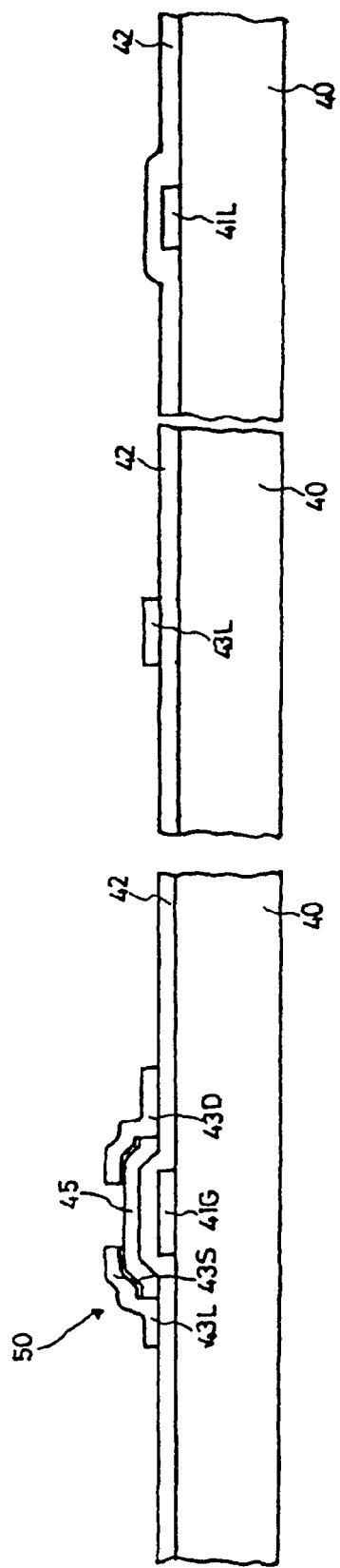
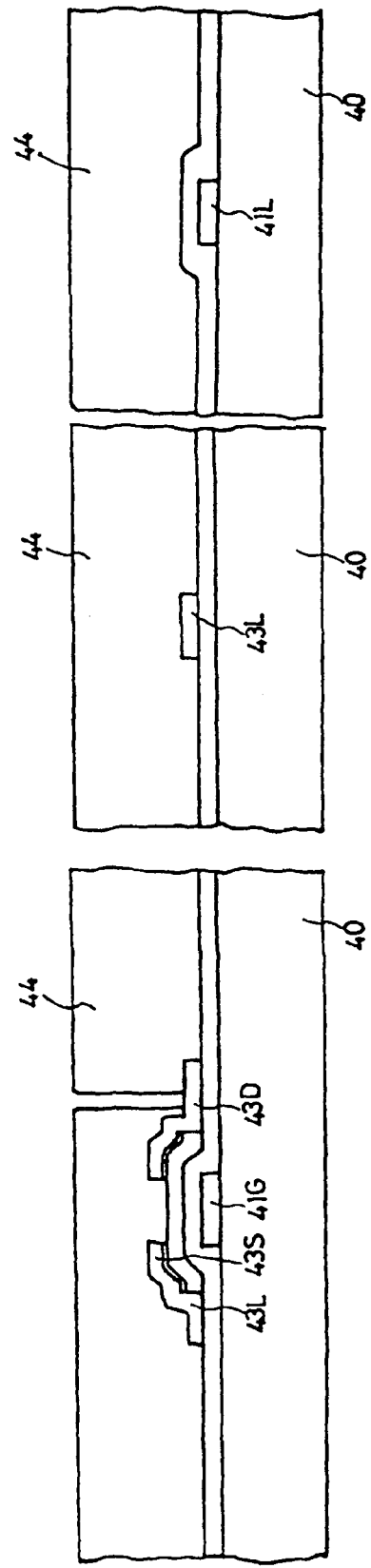
FIG.5A
FIG.5B

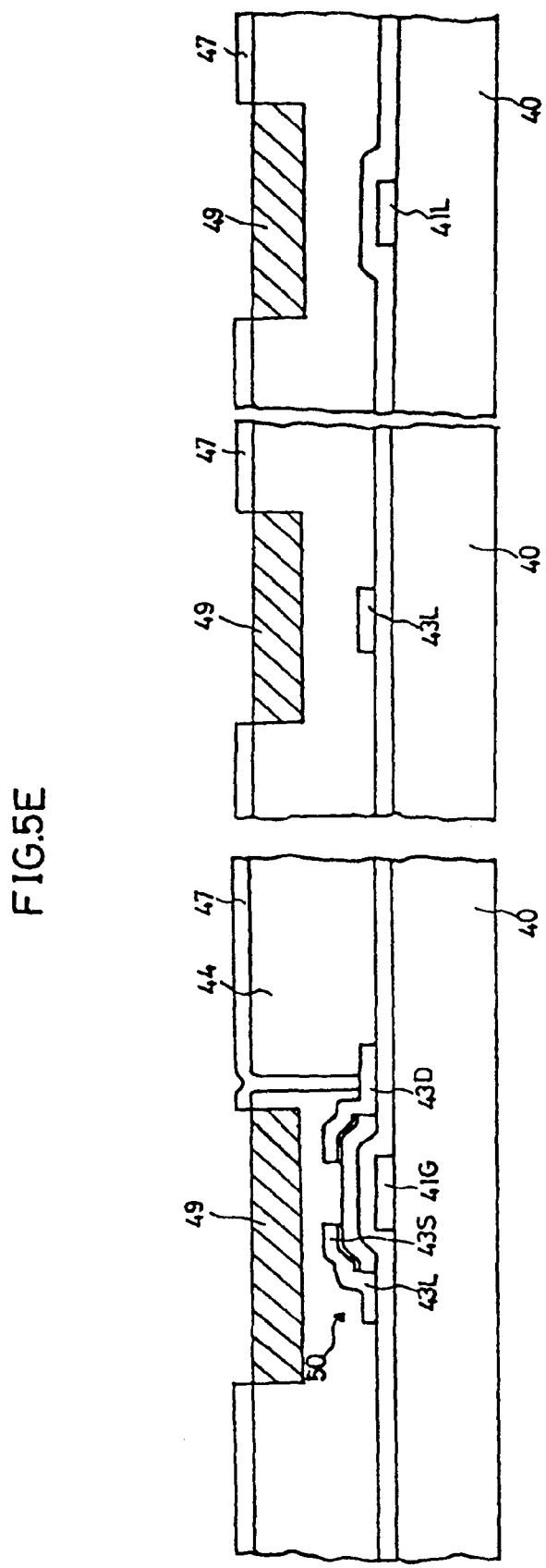

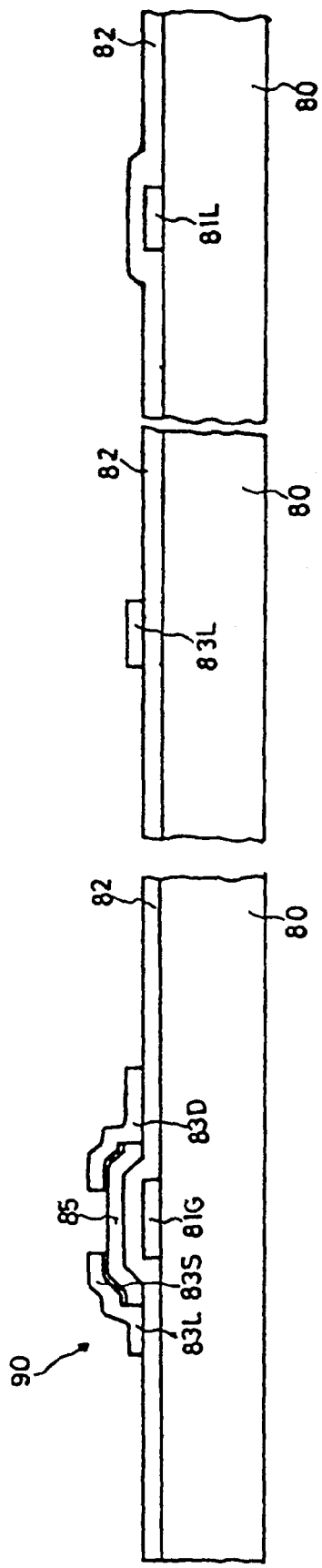
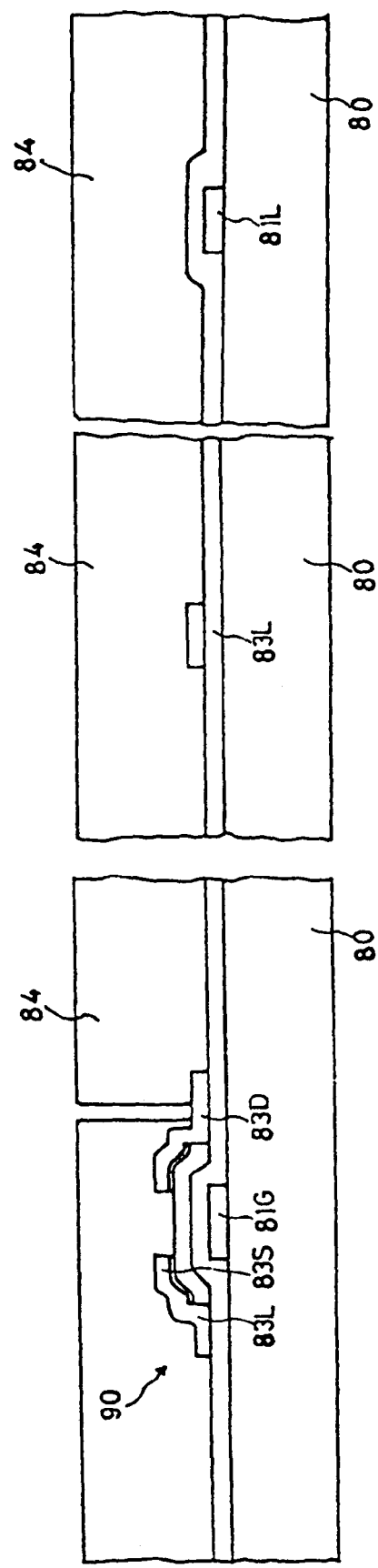
FIG.8A
FIG.8B

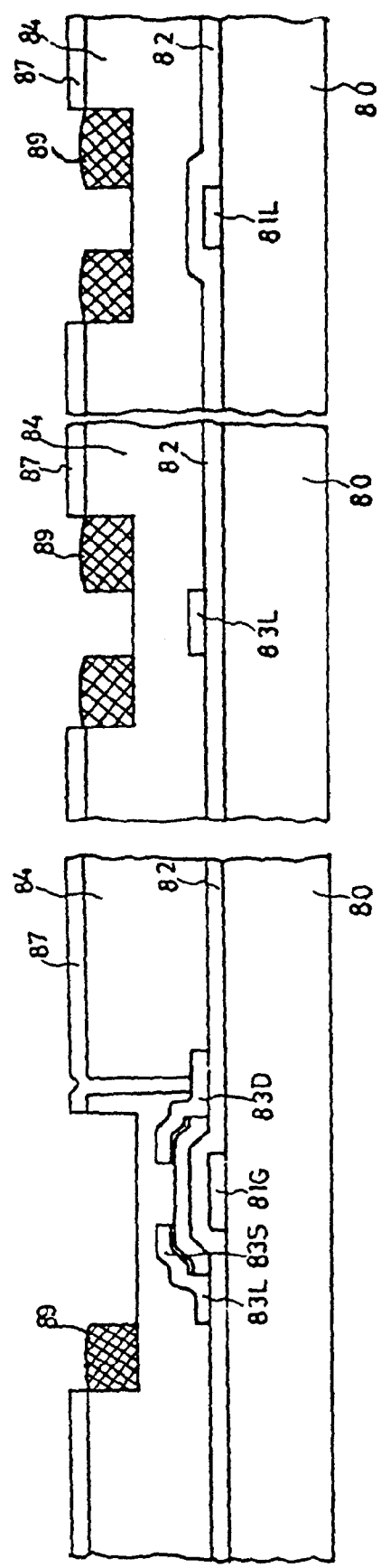

METHOD OF MANUFACTURING A LIQUID CRYSTAL DISPLAY

This is a division of application Ser. No. 08/874,282, filed Jun. 13, 1997 now U.S. Pat. No. 6,122,025, the contents of which are incorporated herein by reference.

BACKGROUND OF THE INVENTION

1. Field of the Invention

The present invention relates to a liquid crystal display (LCD) and method for manufacturing the LCD. More specifically, the present invention relates to a liquid crystal display (LCD) and method for manufacturing the LCD, in which the opening efficiency of the LCD is increased.

2. Description of the Related Art

Generally, a thin film transistor liquid crystal display (TFT-LCD) comprises a lower substrate, an upper substrate, a liquid crystal, and a polarized light plate. The lower substrate includes a thin film transistor and a pixel electrode, and the upper substrate includes a color filter and a common electrode. The liquid crystal is placed between the upper and lower substrates, while the polarized light plate, which polarizes natural light, is attached to an exterior surface of the two substrates.

To block unwanted light, the upper substrate includes a conventional black matrix. Specifically, the black matrix passes only that light which is passed by the pixel electrode and the color filter. When the black matrix is formed on the upper substrate, however, an adhesion margin of approximately 6-10 µm is employed to account for any misalignment between the upper and lower substrates. The adhesion margin cause the black matrix to overlap the pixel electrode, which, in turn, significantly decreases the opening efficiency of the LCD.

To overcome this problem, the it has been proposed to form the black matrix on the lower substrate. This reduces the adhesion margin and increases the opening efficiency. FIG. 1 is a plan view of an LCD in which the black matrix is formed on the lower substrate.

Referring to FIG. 1, the LCD comprises a scan line 11L, a signal line 13L, a plurality of pixel electrodes 17, a black matrix 19, and a thin film transistor 20. Thin film transistor 20 is located at a region where signal line 13L crosses scan line 11L, and further includes, a gate electrode 11G, a gate insulating film 12 (see FIG. 2), a source electrode 13S, a drain electrode 13D and an active layer 15. Gate electrode 11G connects to scan line 11L and source electrode 13S connects to signal line 13L. Drain electrode 13D is formed on the opposite side of gate electrode 11G where source electrode 13S is formed. Drain electrode 13D connects to a corresponding pixel electrode 17.

The hatched area of FIG. 1 represents black matrix 19, which completely covers a metal pattern of the LCD. Specifically, black matrix 19 covers signal line 13L and scan line 11L, but does not cover a part of drain electrode 13D. Black matrix 19 also covers part of pixel electrode 17 to prevent light from entering between the metal pattern and pixel electrode 17.

FIGS. 2A to 2C are sectional views taken along lines A-A', B-B', and C-C', respectively, of FIG. 1. Referring to these figures, black matrix 19 is formed on an interlayer insulating film 14. Interlayer insulating film 14 covers scan line 11L, signal line 13L, and thin film transistor 20. Black matrix 19 covers insulating film 14 at the area between pixel electrodes 17. As a result, black matrix 19 prevents light from passing between pixel electrode 17 and each of scan line 11L, signal line 13L, and thin film transistor 20.

In the LCD shown in FIGS. 1 and 2A and 2B, black matrix 19 is formed on the lower substrate, thus reducing the required adhesion margin. Furthermore, forming black matrix 19 on the lower substrate also increases the opening efficiency by reducing the amount black matrix 19 overlaps pixel electrode 17. However, an adhesion margin of about 2-3 µm must still be used to account for any misalignment between the upper and lower substrates. Moreover, an adhesion margin of about 2-3 µm substantially reduces the opening efficiency of the LCD. An additional problem with the above LCD is that an additional mask pattern is required to form black matrix 19, thus reducing the production yield.

SUMMARY OF THE INVENTION

The present invention is directed to an liquid crystal display (LCD) and a method of fabricating an LCD that substantially obviates one or more of the problems caused by limitations and disadvantages of the conventional LCD described above.

To achieve these and other advantages, the liquid crystal display consistent with the present invention includes an insulating substrate and a switching device over the insulating substrate. Also included is an interlayer insulating film over the switching device, the interlayer insulating film having a trench formed therein. Finally, a black matrix is provided in at least a part of the trench.

According to another aspect, the LCID includes an insulating substrate, a switching device over the insulating substrate, and an interlayer insulating film over the switching device. In addition, a pixel electrode is included over a first part of the interlayer insulating film. Finally, a black matrix is included over a second part of the interlayer insulating film, wherein the pixel electrode and the black matrix do not overlap each other.

According to another aspect, the LCD includes an insulating substrate having a signal line and a scan line. The scan line forms a crossing pattern with the signal line. A switching device is connected to the signal line and the scan line. An interlayer insulating film is formed on top of the signal line, the scan line, and the switching device. A pixel electrode is formed on the interlayer insulating film and connected to the switching device. A trench is formed in a part of the interlayer insulating film where the pixel electrode is not formed. Finally, a black matrix is formed in a predetermined part of the trench.

According to another aspect, a method of manufacturing a liquid crystal display, includes the steps of forming a switching device over an insulating substrate, and forming an interlayer insulating film over the switching device. The interlayer insulating film is then pattern-etched to form a trench therein. A black matrix is then formed in at least a part of the trench.

According to another aspect, the invention comprises a method of manufacturing a liquid crystal display. The method includes the step of forming a signal line, a scan line, and a switching device on an insulating substrate. Connecting the switching device to the signal line and to the scan line. Forming an interlayer insulating film on top of the signal line, the scan line, and the switching device. Pattern-etching the interlayer insulating film to form a contact hole, wherein the contact hole exposes an electrode of the switching device. Forming a pixel electrode on the pattern-etched interlayer insulating film such that the pixel electrode is connected to the electrode of the switching device. Pattern etching the interlayer insulating film to form a trench in the interlayer insulating film. Forming a black matrix in a predetermined portion of the trench of the interlayer insulating film.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings:

FIGS. 5A to 5E illustrate a process for manufacturing the LCD of FIG. 3;

FIGS. 8A to 8G illustrate a process for manufacturing the LCD of FIG. 6.

DETAILED DESCRIPTION

Embodiments of the present invention will now be described with reference to the accompanying drawings.

Figure 1:
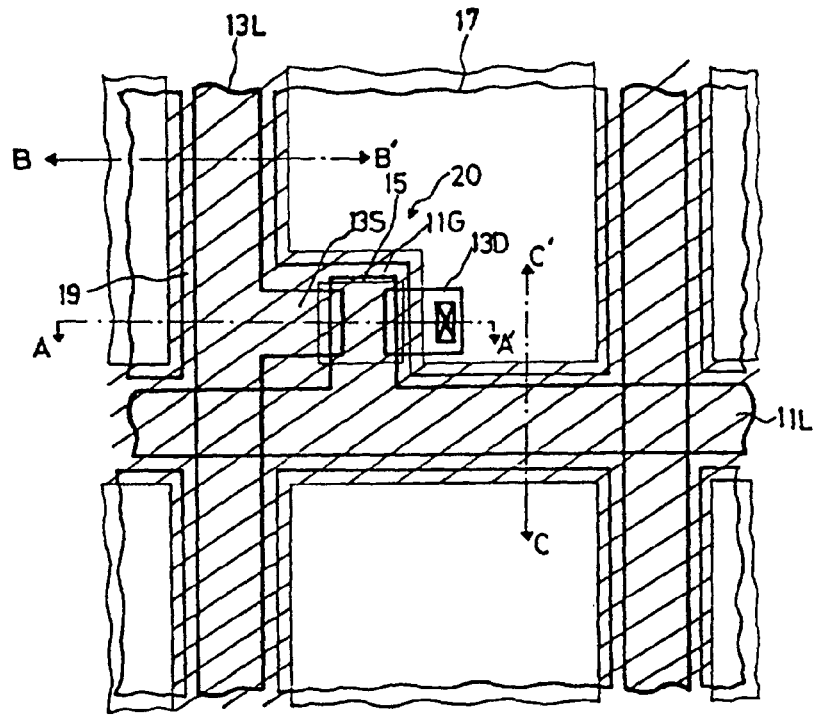
FIG. 1 is a plan view of a liquid crystal display (LCD) system.
Figure 2A:
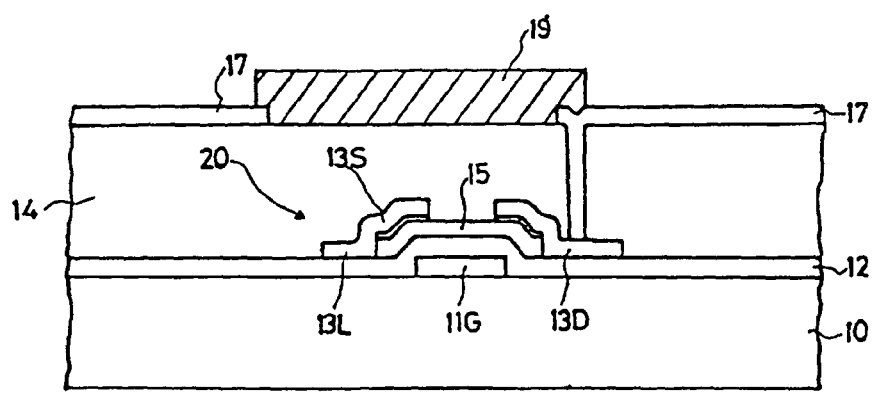
FIGS. 2A to 2C are sectional views taken along lines A-A', B-B', and C-C', respectively, of FIG. 1.
Figure 2B:
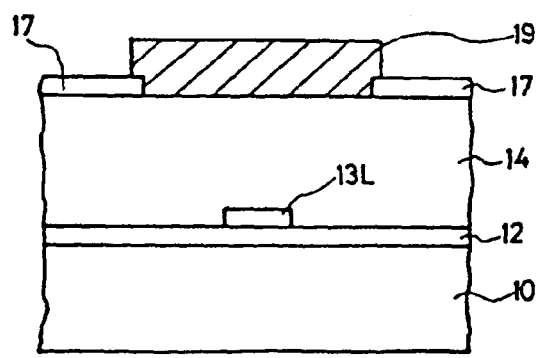
Figure 2C:
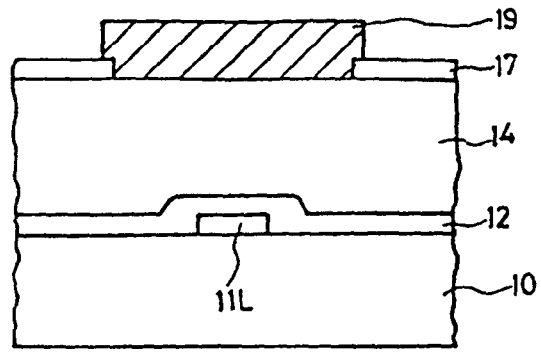
Figure 3:
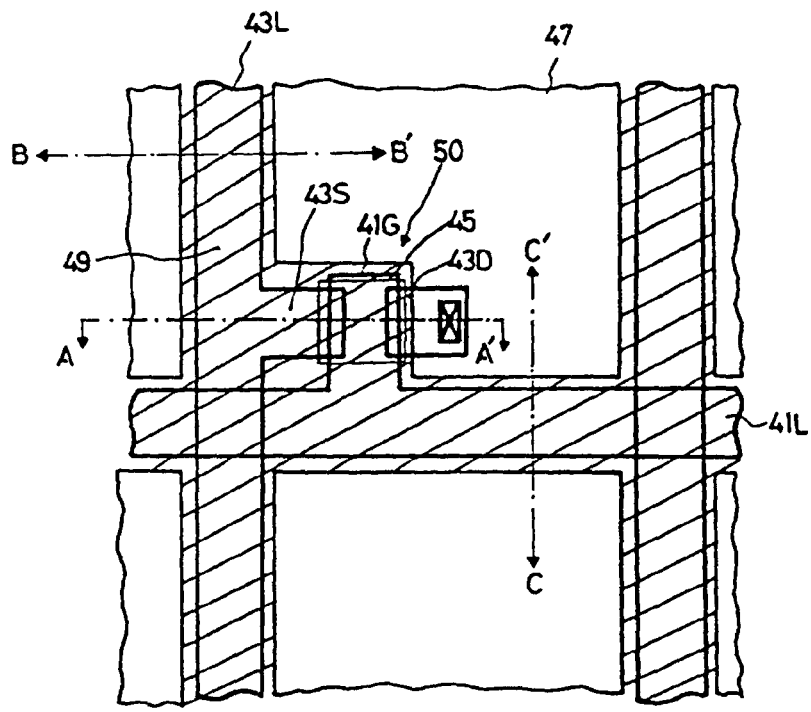
FIG. 3 is a plan view of a LCD consistent with a first embodiment of the invention.

Referring to FIG. 3, the LCD comprises a scan line 41L, a signal line 43L, a plurality of pixel electrodes 47, a black matrix 49, and a thin film transistor 50. Scan line 41L and signal line 43L form a crossing pattern on an insulating substrate 40. Thin film transistor 50 is located at a region where signal line 43L crosses scan line 41L, and functions as a switching device. Thin film transistor 50 comprises a gate electrode 41G, a gate insulating film 42, a source electrode 43S, a drain electrode 43D, and an active layer 45. Gate electrode 41G connects to scan line 41L and source electrode 43S connects to signal line 43L. Drain electrode 43D is formed on the opposite side of gate electrode 41G where source electrode 43S is formed. Drain electrode 43D connects to a corresponding pixel electrode 47.

The hatched area of FIG. 3 represents black matrix 49, which completely covers a metal pattern of the LCD between adjacent pixel electrodes 47. Specifically, black matrix 49 covers signal line 43L and scan line 41L, but does not cover a part of drain electrode 43D. Thus, black matrix 49 covers each part of the LCD where light may pass between the metal pattern and pixel electrodes 47, while at the same time reducing the amount it overlaps on pixel electrodes 47. Ideally, it is most desirable that black matrix 49 and pixel electrode 47 do not overlap. However, completely eliminating the overlap is practically difficult, if not impossible, for at least the following reasons. Firstly, overetching tends to occur when etching insulation layers below the pixel electrode using the pixel electrode as a mask. Secondly, since when the layer is exposed to light, the light path tends to vary, even the area of the pixel electrode overlapping the black matrix tends to get exposed.

Figure 4A:
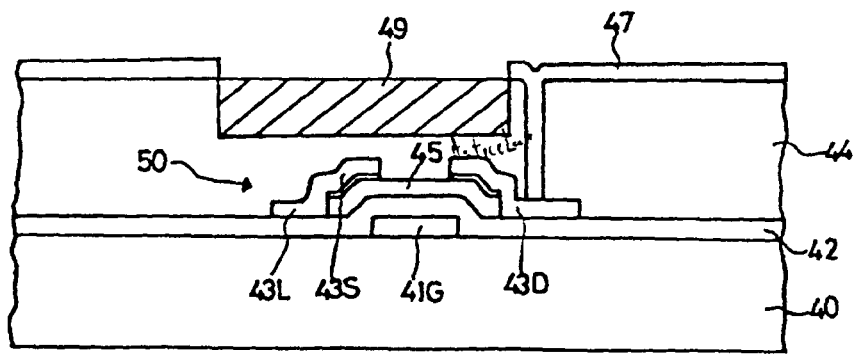
FIGS. 4A to 4C are sectional views taken along lines A-A', B-B', and C-C', respectively, of FIG. 3.
Figure 4B:
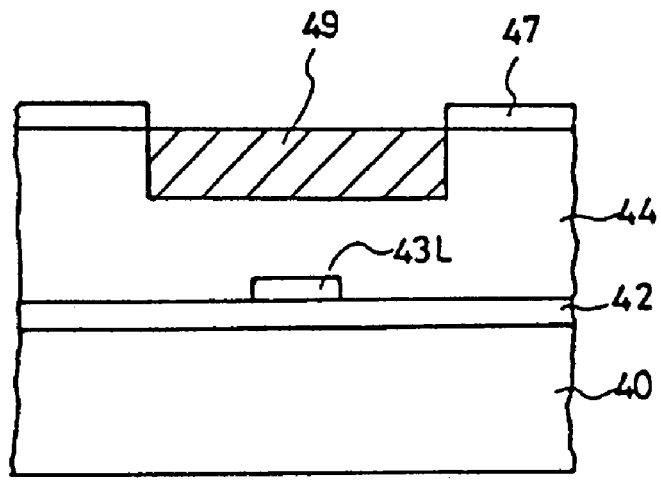
Figure 4C:
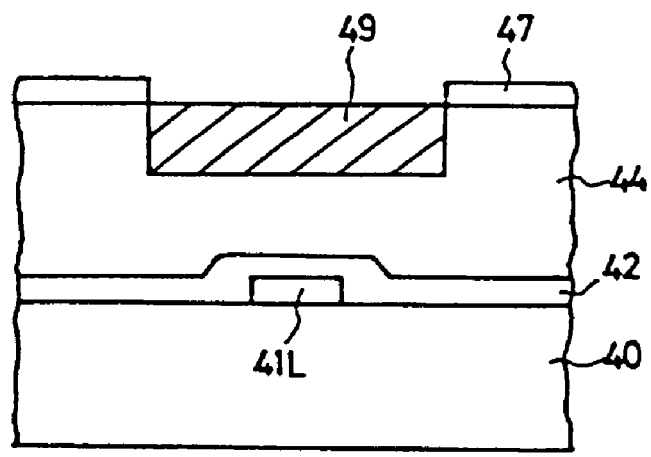

FIGS. 4A to 4C are sectional views taken along lines A-A', B-B', and C-C', respectively, of FIG. 3. Referring to these figures, scan line 41L, signal line 43L, and thin film transistor 50 are formed on an insulating substrate 40 and gate insulating film 42. An interlayer insulating film 44 is formed on gate insulating film 42, which is formed on insulating substrate 40. Interlayer insulating film 44 covers thin film transistor 50. Black matrix 49 is disposed within a 1 µm deep trench formed in interlayer insulating film 44 between adjacent pixel electrodes 47. Thus, the thickness of insulating film 44 is preferably greater than 1 µm to prevent black matrix 49 from contacting thin film transistor 50. This prevents harmful materials in the black resin of black matrix 49 from contaminating active layer 45. Accordingly, black matrix 49 prevents light from passing between pixel electrode 47 and either scan line 41L, signal line 43L, or thin film transistor 50. Furthermore, according to the present invention, the amount black matrix 49 overlaps pixel electrode 47 is reduced, thus increasing the LCD's opening efficiency.

Figure 5C:
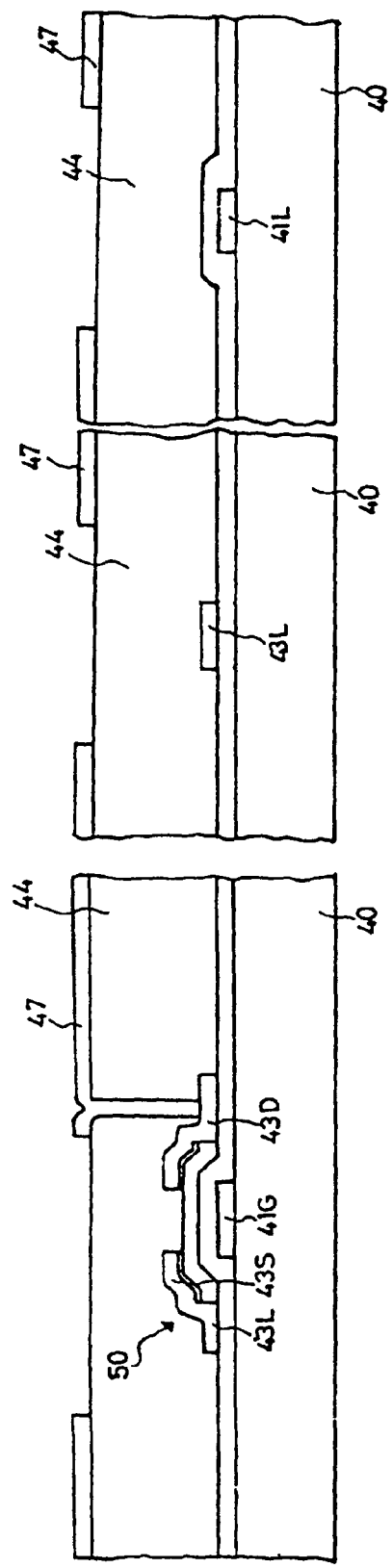

FIGS. 5A to 5E illustrate a process for manufacturing the LCD of FIG. 3. Each view shown in each of these figures corresponds to a cross-sectional view taken along lines A-A', B-B', and C-C' of FIG. 3. Referring to FIG. 5A, signal line 43L, scan line 41L and thin film transistor 50 are formed on insulating substrate 40 by a conventional method known to those skilled in the art. Thin film transistor is preferably formed as having a bottom-gate structure, although other types of structures may be used consistent with the present invention.

Referring to FIG. 5C, interlayer insulating film 44 is formed by chemical vapor depositing an insulating material on the exposed surface of insulating substrate 40. The insulating material is preferably an organic insulating material, such as benzocyclobutane, or may be an inorganic insulating material, such as oxidized or nitrified silicon. Furthermore, sputtering or evaporation techniques may be used to form interlayer insulating film 44. As described above, interlayer insulating film has a depth of greater than 1 µm to prevent black matrix 49 from contacting active layer 45, which serves as a channel region in transistor 50. Next, using a conventional etching technique, interlayer insulating film 44 is pattern-etched to form a contact hole which exposes a part of drain electrode 43D. According to a preferred embodiment of the invention, interlayer insulating film 44 is dry etched using either a HCl, Hbr, $H_2$, or $H_4$ gas.

Referring to FIG. 5C, a vapor deposition process is used to form a transparent conductive layer 47 on interlayer insulating film 44 and the exposed drain electrode 43D. Transparent conductive layer 47 is pattern-etched to form the plurality of pixel electrodes 47, each connected to a corresponding drain electrode 43D. Transparent conductive layer 47 preferably comprises a transparent conductive material, such as indium tin oxide. According to a preferred embodiment of the invention, transparent conductive layer 47 is wet etched using either a HCl, HBr, or $H_2$ Solution.

Figure 5D:
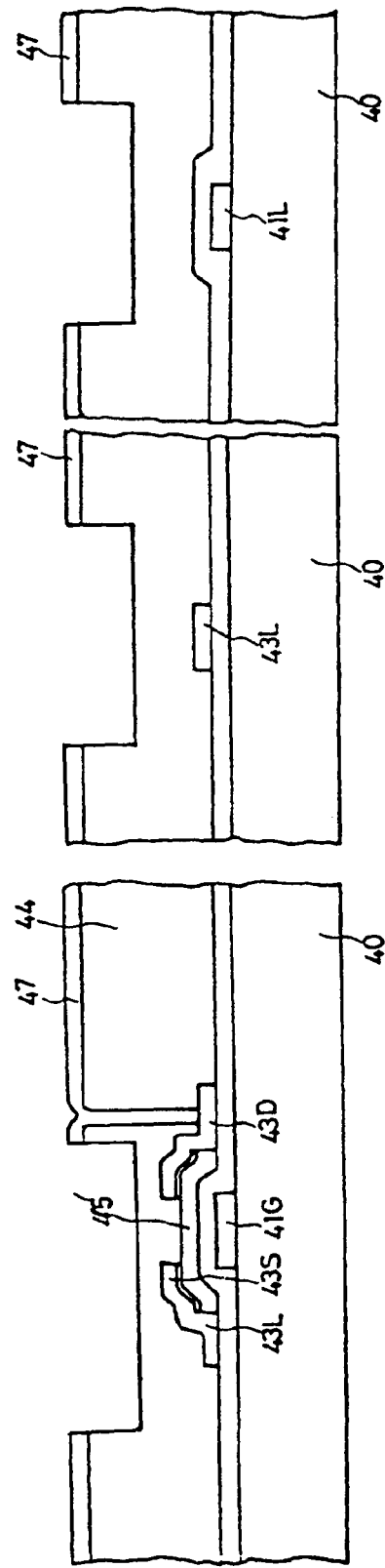

Referring to FIG. 5D, a 1 µm deep trench is formed in interlayer insulating film 44 using pixel electrode 47 as a mask. In other words, since pixel electrode comprises a mask material, the trench is formed where pixel electrode 47 is not disposed on film 44.

Referring to FIG. 5E, the trench is filled with a black resin by covering the whole surface of the substrate with the resin. The black resin has a photosensitivity enabling it to block light after a development process. After the upper portion of pixel electrode 47 is exposed, the black resin is then removed. In this way, the black resin remains only in the trench of interlayer insulating film 44. The completed LCD in accordance with the present invention is thus formed as shown in FIG. 5E.

As described in the above manufacturing process, the upper and lower substrates are self-aligned by using pixel electrode 47 as a mask when forming black matrix 49. This minimizes the amount black matrix 49 overlaps pixel electrode 47, and increases the opening efficiency of the LCD. Furthermore, the production yield also increases since an additional pattern mask is not required to form black matrix 49.

Figure 6:
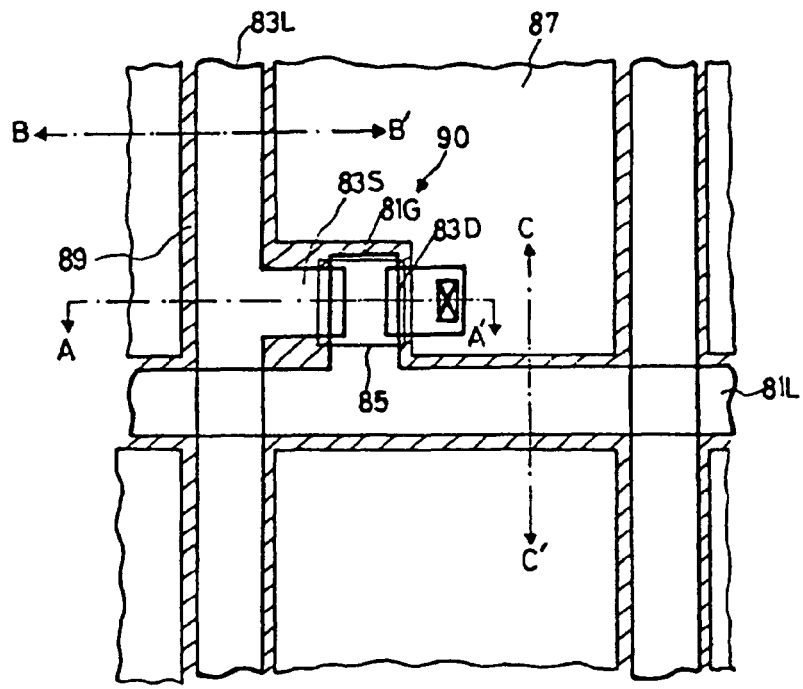
FIG. 6 is a plan view of a LCD consistent with a second embodiment the invention.

FIG. 6 is a plan view of an LCD consistent with a second embodiment of the invention, which uses an alternative black matrix. Referring to FIG. 6, the LCD comprises a scan line 81L, a signal line 83L, a plurality of pixel electrodes 87, a black matrix 89, and a thin film transistor 90. Signal line 81L and scan line 81L form a crossing pattern on an insulating substrate 80. Thin film transistor 90 is located at a region where lines 83L and 81L cross, and functions as a switching device. Thin film transistor 90 comprises a gate electrode 81G, insulating film 82 (see FIG. 7A, for example), a source electrode 83S, a drain electrode 83D, and an active layer 85. Source electrode 83S connects to signal line 83L, and gate electrode 81G connects to scan line 81L. Drain electrode 83D is formed on the opposite side of gate electrode 81G where source electrode 83S is formed. Drain electrode 83D connects to a corresponding pixel electrode 87.

The hatched area of FIG. 6 represents a black matrix 89 formed between pixel electrode 87 and signal line 83L, and between pixel electrode 87 and scan line 81L. Black matrix 89 does not cover pixel electrode 87, signal line 83L, scan line 81L or thin film transistor 90.

Figure 7A:
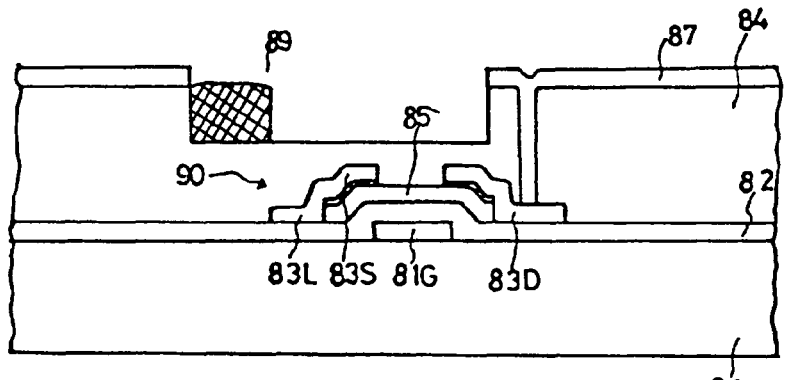
FIGS. 7A to 7C are sectional views taken along lines A-A', B-B', and C-C', respectively, of FIG. 6.
Figure 7B:
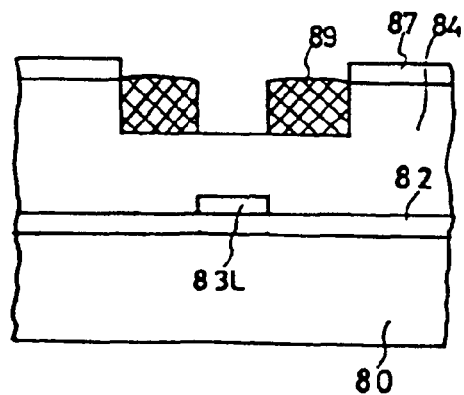
Figure 7C:
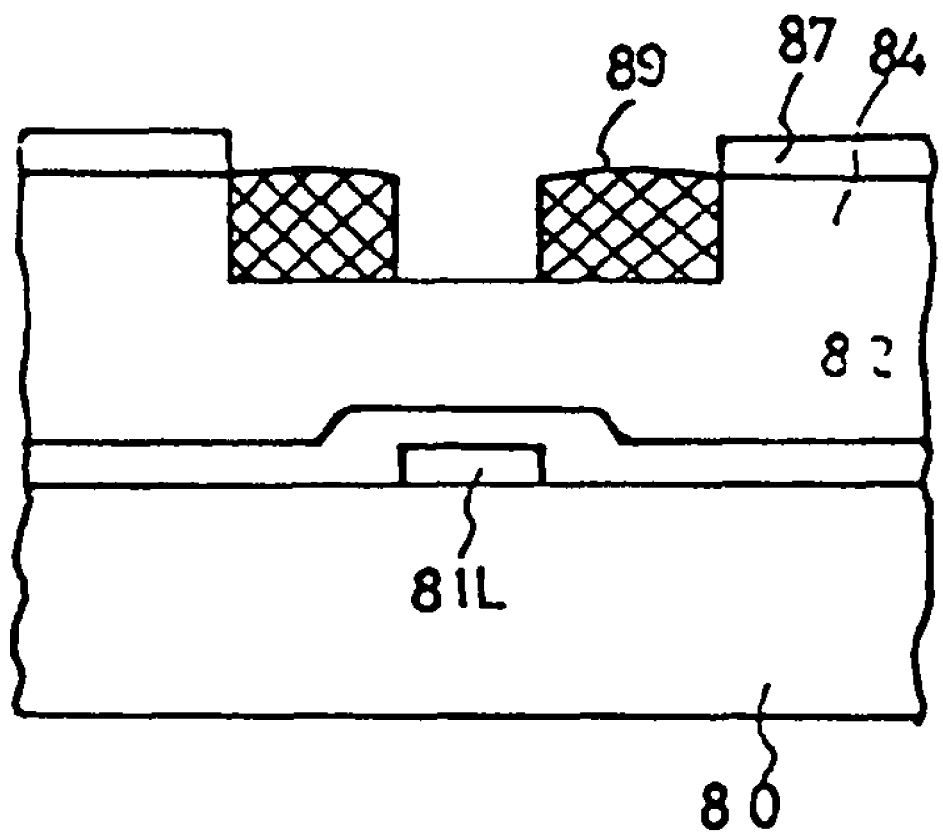

FIGS. 7A to 7C are sectional views taken along lines A-A, B-B', and C-C', respectively, of FIG. 6. Referring to these figures, signal line 83L, scan line 81L, and thin film transistor 90 are formed on insulating substrate 80 and gate insulating film 82. An interlayer insulating film 84 is formed on gate insulating film 82, which is formed on insulating layer 80. Interlayer insulating film 84 covers thin film transistor 90. Black matrix 89 is disposed within the interior of a 1 μm deep trench formed in interlayer insulating film 84. The thickness of interlayer insulating film 84 is preferably greater than 1 μm to prevent black matrix 89 from contacting thin film transistor 90. This prevents harmful materials in the black resin of black matrix 89 from contaminating active layer 85. Furthermore, the amount black matrix 89 overlaps either pixel electrode 87, signal line 83L, scan line 81L or thin film transistor 90 is minimal. Accordingly, the opening efficiency of the LCID is increased. Again, as explained above, although the complete elimination of the overlapping between black matrix 89 and pixel electrode 87 is most desirable, the complete elimination is practically difficult, if not impossible.

Figure 8C:
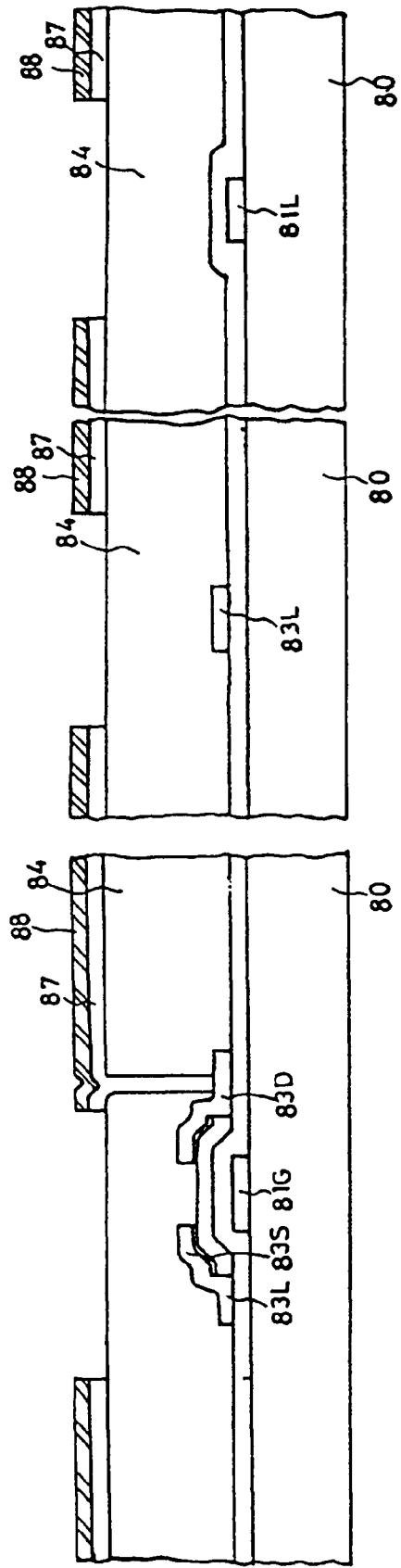

FIGS. 8A to 8G illustrate a process for manufacturing the LCD of FIG. 6. Each view shown in each of these figures corresponds to a cross-sectional view taken along lines A-A', B-B', and C-C' of FIG. 6. Referring to FIG. 8A, signal line 83L, scan line 81L and thin film transistor 90 are formed on insulating substrate 80 by a conventional method known to those skilled in the art. Thin film transistor is preferably formed as having a bottom-gate structure, although other types of structures may be used consistent with the present invention.

Referring to FIG. 8B, interlayer insulating film 84 is formed by chemical vapor depositing an insulating material on the exposed surface of insulating substrate 80. The insulating material is preferably an organic insulating material, such as benzocyclobutane, or may be an inorganic insulating material, such as an oxidized or nitrified silicon. Furthermore, sputtering or evaporation techniques may be used to form interlayer insulating film 84. As described above, interlayer insulating film has a depth greater than 1 μm to prevent black matrix 89 from contacting active layer 85, which serves as a channel region in transistor 90. Next, using a conventional etching technique, interlayer insulating film 84 is pattern-etched to form a contact hole which exposes a part of drain electrode 83D. According to a preferred embodiment of the invention, interlayer insulating film 44 is dry etched using either a HCl, HBr, $H_2$ or $CH_4$ gas.

Referring to FIG. 8C, a vapor deposition process is used to form a transparent conductive layer 87 and an opaque metal layer 88 on interlayer insulating film 84 and the exposed drain electrode 83D. Transparent conductive layer 87 and opaque layer 88 are then pattern etched using a pattern mask. In other words, opaque metal layer 88 is pattern-etched using the pattern mask, and transparent conductive layer 87 is pattern-etched using the pattern-etched opaque metal layer 88 as a pattern mask. By this process, transparent conductive layer 87 is pattern-etched into the plurality of pixel electrodes 87, each connected to a corresponding drain electrode 83D. Transparent conductive layer 87 preferably comprises a transparent conductive material, such as indium tin oxide. According to a preferred embodiment of the invention, transparent conductive layer 87 is wet etched using either a HCl, HBr, or $H_2$ solution. A predetermined distance separates pixel electrodes 87 from signal line 83L and scan line 81L, thus preventing pixel electrode 87 from overlapping either line 83L or 81L.

Figure 8D:
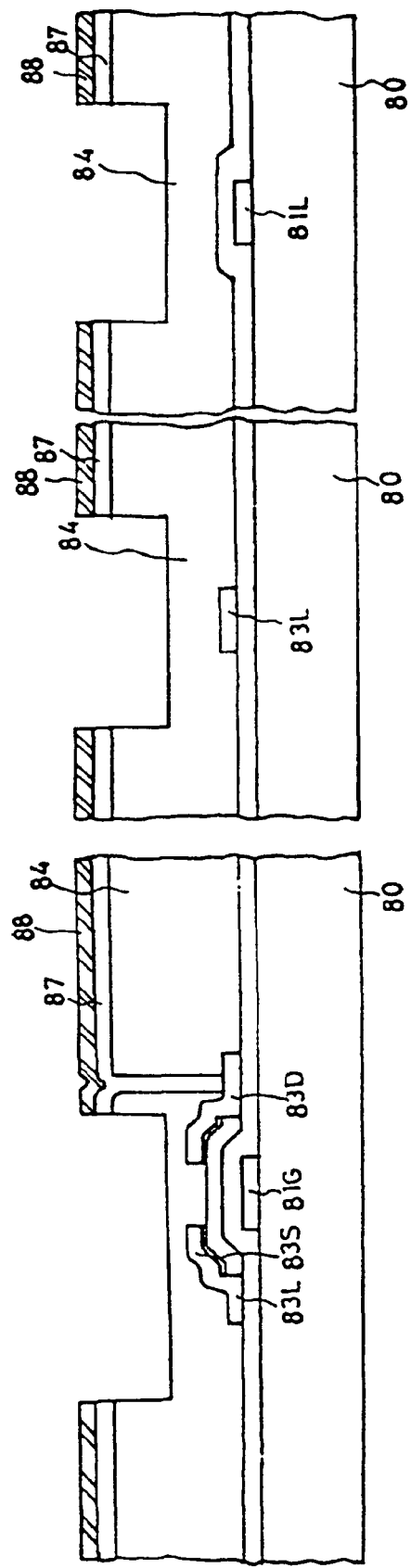

Referring to FIG. 8D, a 1 μm deep trench is formed in interlayer insulating film 84 using pixel electrode 47 as a mask. In other words, since pixel electrode 87 comprises a mask material, the trench is formed where pixel electrode 87 is not disposed on film 84.

Figure 8E:
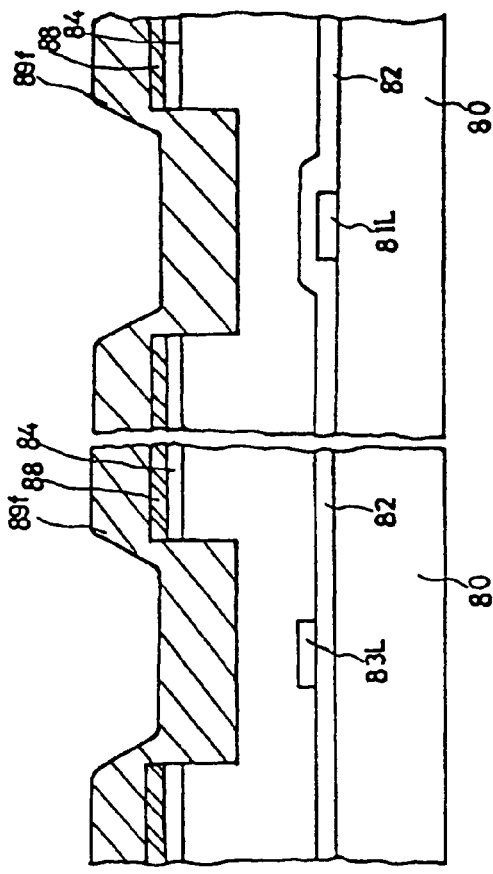
Figure 8E:
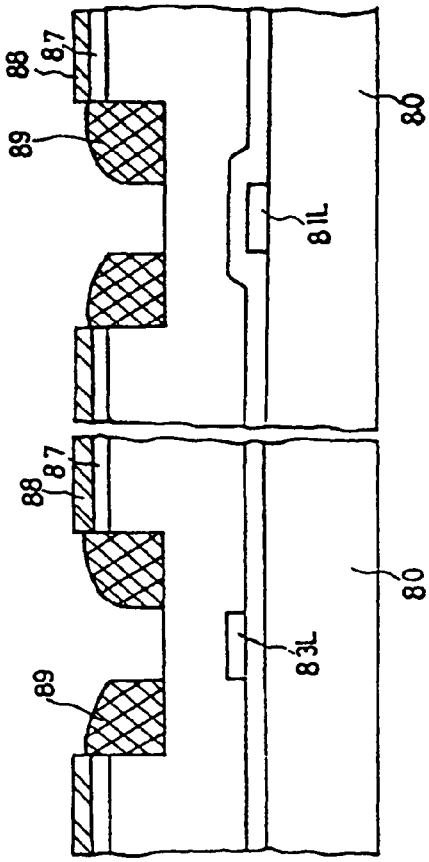

Referring to FIG. 8E, the whole surface of the substrate is then coated with a black resin in order to fill the trench. The black resin has a photosensitivity, like a photoresist, enabling it, to block light. If black matrix 89 is formed only in the interior of the trench, then a black layer 89 is preferably used to cover the trench.

Figure 8F:
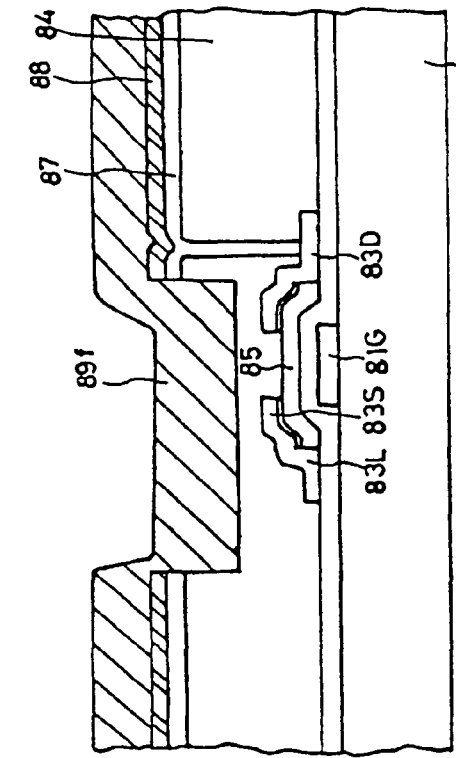
Figure 8F:
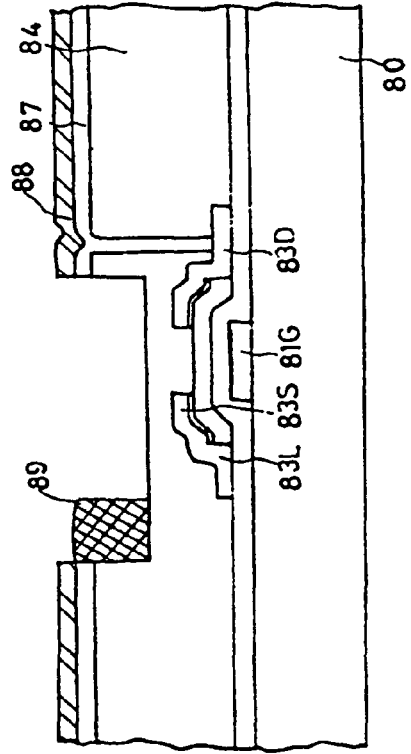

Referring to FIG. 8F, after the rear surface is exposed to light, a developing process forms black matrix 89 in the trench's interior. By disposing black matrix 89 within the interior of the trench in the non-pixel region and by using pixel electrode as a mask, the amount black matrix 89 overlaps pixel electrode 87 is minimized.

When the rear surface is exposed to light, the light irradiated from the back surface of the substrate does not pass through either scan line 81L, signal line 83L, thin film transistor 90, or the part of opaque metal layer 88 overlaps pixel electrode 87. However, light does pass through the region where black resin layer 89f does overlap either signal line 83L, scan fine 81L, or thin film transistor 90. Since the black resin has a negative photosensitivity, only resin exposed to light will harden. Thus, black matrix 89 is formed after the developing process on the exposed portion. As shown in FIG. 8F, this portion is where signal line 83L, scan line 81L and thin film transistor 90 are not overlapping with black resin layer 89f within the trench. Therefore, black matrix 89 is automatically positioned using the negative photosensitivity of the black resin, and without using an additional mask.

As shown in FIG. 8G, pixel electrode 87 is exposed by removing opaque metal layer 88. The completed LCD in accordance with the present invention is thus formed as shown in FIG. 8G.

In each embodiment, the amount the pixel electrode overlaps either the signal line or the scan line is minimized, and the opening efficiency of the LCD is increased. In addition, the production yield is improved since the rear surface exposure and the developing process do not require an additional pattern mask. However, when interlayer insulating film 44 or 84 comprises an organic insulating material having a low insulating efficiency, the pixel electrode overlaps a predetermined portion of the signal line and the scan line. Thus, the black matrix is formed only around the thin film transistor corresponding to the region where light is streamed, thereby improving the opening efficiency.

As stated above, the present invention provides an LCD and a method for manufacturing an LCD, in which the LCD's pixel electrodes are formed on an interlayer insulating film made of a mask material. A trench is formed in the interlayer insulating film and is filled with a black matrix. In this way, the black matrix does not overlap the pixel electrode or reduce the opening efficiency, while at the same time preventing the entry of light. The black matrix is formed using a black resin having a negative photosensitivity. The black resin is then removed by a developing material, without the use of an additional pattern mask, thus increasing the production yield.

It will be apparent to those skilled in the art that various modifications and variations can be made to the apparatus and method of the present invention, without departing from the spirit or scope of the invention. The present invention covers the modifications and variations of this invention provided they come within the scope of the appended claims and their equivalents.

What is claimed is:

1. A method of manufacturing a liquid crystal display, comprising the steps of:
   forming a switching device over an insulating substrate;
   forming a metal line over the insulating substrate;
   forming an interlayer insulating film over the switching device;
   forming a pixel electrode over the interlayer insulating film;
   forming trenches right above the switching device and the metal line, the trenches being formed in the interlayer insulating film and to have at least a width greater than a width of the metal line;
   depositing a black resin on the interlayer insulating film and within the trenches; and
   developing the black resin to remove a part of the black resin within the trenches to expose the upper part of the pixel electrode and a bottom surface of the trenches to form a black matrix within the trenches over the insulating substrate.

2. The method of claim 1, wherein the step of forming trenches comprises the step of:
   forming the trenches greater than 1 μm deep from a surface of the interlayer insulating film.

3. The method of claim 1, further comprising the step of:
   pattern-etching the interlayer insulating film to form a contact hole, wherein the contact hole exposes an electrode of the switching device; and
   wherein the step of forming the pixel electrode includes:
      forming the pixel electrode such that the pixel electrode is connected to the electrode of the switching device through the contact hole.

4. The method of claim 3, wherein the step of forming the pixel electrode comprises the steps of:
   forming a transparent conductive layer on the interlayer insulating film and the exposed electrode of the switching device;
   vapor-depositing an opaque material layer on the transparent conductive layer; and
   pattern-etching the opaque material layer and the transparent conductive layer to form the pixel electrode.

5. The method of claim 4, the step of forming the pixel electrode further comprises the steps of:
   after forming the black matrix, removing the pattern-etched opaque material layer.

6. The method of claim 4, further comprising:
   covering the pattern-etched opaque material layer and the trenches in the interlayer insulating film with the black resin;
   exposing a rear surface of the insulating substrate to light; and
   removing the black resin that was not exposed to the light.

7. The method of claim 6, wherein:
   the opaque material layer includes a metal material.

8. A method of manufacturing a liquid crystal display, comprising the steps of:
   forming a signal line on an insulating substrate;
   forming a scan line of the insulating substrate;
   forming a switching device on the insulating substrate connected to the signal line and to the scan line;
   forming an interlayer insulating film on top of the signal line, the scan line, and the switching device;
   pattern-etching the interlayer insulating film to form a contact hole, wherein the contact hole exposes an electrode of the switching device;
   forming a pixel electrode on the pattern-etched interlayer insulating film such that the pixel electrode is connected to the electrode of the switching device through the contact hole;
   forming trenches right above the switching device and one of the signal or scan line, the trenches being formed in the interlayer insulating film and to have at least a width greater than a width of the one of the signal or scan line;
   depositing a black resin on the interlayer insulating film and within the trenches; and
   developing the black resin to remove a part of the black resin within the trenches to expose the upper part of the pixel electrode and a bottom surface of the trenches to form a black matrix within the trenches of the interlayer insulating film over the insulating substrate.

9. The method of claim 8, wherein the step of forming trenches comprises the step of:
   forming the trenches greater than 1 μm deep.

10. The method of claim 8, wherein the step of forming the pixel electrode comprises the steps of:
    forming a transparent conductive layer on the interlayer insulating film and the exposed electrode of the switching device;
    vapor-depositing an opaque material layer on the transparent conductive layer; and
    pattern-etching the opaque material layer and the transparent conductive layer to form the pixel electrode.

11. The method of claim 10, the step of forming the pixel electrode further comprises the steps of:
    after forming the black matrix, removing the pattern-etched opaque material layer.

12. The method of claim 11, further comprising:
    covering the pattern-etched opaque material layer and the trenches in the interlayer insulating film with the black resin;
    exposing a rear surface of the insulating substrate to light; and
    removing the black resin that was not exposed to the light.

13. The method of claim 12, wherein the step of vapor depositing the opaque material layer includes:
    vapor depositing an opaque material layer comprising a metal material.

* * * * *